(12) United States Patent
Foo et al.

(10) Patent No.: US 9,315,277 B2
(45) Date of Patent: Apr. 19, 2016

(54) SYSTEM AND METHOD FOR TRANSFERRING FUEL IN FLIGHT FROM A TANKER AIRCRAFT TO MULTIPLE RECEIVER AIRCRAFT

(71) Applicant: Singapore Technologies Aerospace Ltd., Paya Lebar (SG)

(72) Inventors: Chi Hui Frederic Foo, Singapore (SG); Siew Liong Tay, Singapore (SG); Kim Chiew Tay, Singapore (SG); Zheng Liang Lu, Singapore (SG)

(73) Assignee: Singapore Technologies Aerospace Ltd., Paya Lebar (SG)

( * ) Notice: Subject to any disclaimer, the term of this patent is extended or adjusted under 35 U.S.C. 154(b) by 197 days.

(21) Appl. No.: 13/972,707

(22) Filed: Aug. 21, 2013

(65) Prior Publication Data

US 2014/0346279 A1 Nov. 27, 2014

(30) Foreign Application Priority Data

May 21, 2013 (SG) ................................ 201303948-2

(51) Int. Cl.
 *B64D 39/00* (2006.01)
 *B64D 39/04* (2006.01)
 *B64D 39/02* (2006.01)

(52) U.S. Cl.
 CPC ................ *B64D 39/04* (2013.01); *B64D 39/02* (2013.01)

(58) Field of Classification Search
 CPC ........................................................ B64D 39/00

USPC ....................................................... 244/135 A
See application file for complete search history.

(56) References Cited

U.S. PATENT DOCUMENTS

| | | | |
|---|---|---|---|
| 5,326,052 A * | 7/1994 | Krispin et al. | 244/135 A |
| 5,499,784 A | 3/1996 | Crabere et al. | |
| 7,472,868 B2 * | 1/2009 | Schuster et al. | 244/135 A |
| 2002/0074455 A1 | 6/2002 | Ollar | |
| 2006/0208132 A1* | 9/2006 | Jones | 244/10 |
| 2010/0282912 A1* | 11/2010 | Bogg | 244/135 A |
| 2012/0049003 A1* | 3/2012 | Richardson | 244/135 A |
| 2013/0168497 A1* | 7/2013 | Rix | 244/135 A |

FOREIGN PATENT DOCUMENTS

WO  WO 2013/102903 A2  7/2013

OTHER PUBLICATIONS

United Kingdom Intellectual Property Search and Examination Report dated Feb. 21, 2014 for Application No. GB1315051.1, 6 pages.

* cited by examiner

*Primary Examiner* — Christopher P Ellis
*Assistant Examiner* — Richard G Davis
(74) *Attorney, Agent, or Firm* — Eric D. Babych; Brinks Gilson & Lione

(57) ABSTRACT

A trailing boom system for aerial refueling and a method for aerial refueling of multiple receiver aircraft. The trailing boom system for aerial refueling includes a parent pod capable of being connected to a wing of an aircraft, and a detachable pod releasable from the parent pod, the detachable pod including an extendible boom for refueling aircraft in flight.

22 Claims, 13 Drawing Sheets

SYSTEM AND METHOD FOR TRANSFERRING FUEL IN FLIGHT FROM A TANKER AIRCRAFT TO MULTIPLE RECEIVER AIRCRAFT

CROSS-REFERENCE TO RELATED APPLICATIONS

The application hereby claims priority to Singapore Patent Application Number 201303948-2. filed May. 21, 2013. the entire contents of which are hereby incoporated. herein by reference,

FIELD OF INVENTION

Various embodiments relate to an aerial refueling system. In particular, embodiments relate to a trailing boom system for aerial refueling and a method for aerial refueling of multiple receiver aircraft.

BACKGROUND

Aerial refueling of aircraft enables an aircraft to fly farther without landing to refuel, allows an aircraft to continue flight in situations in which no suitable landing fields are available, and allows an aircraft to carry more payload instead of fuel as this fuel can be replenished in flight. In refueling operations, the aircraft that carries and transfers the fuel is the "tanker", and the aircraft that receives this fuel is the "receiver".

The two principal conventional methods of aerial refueling are the "boom/receptacle" method and the "probe/drogue" method.

In the boom/receptacle method, the tanker is equipped with a rigid, pivoted and telescoping boom at the lower aft end of the belly of the aircraft. To connect the boom to the receptacle on the receiver aircraft, the receiver aircraft first flies into a position below and behind the tanker. A boom operator then lowers and aligns the boom with the receiver aircraft's receptacle before extending the boom into the receptacle to hook up the connection for fuel transfer.

In the probe/drogue method, the tanker is equipped with a flexible hose which has a drogue or basket at one end of the flexible hose. The flexible hose may be located on each wing of the tanker. The receiver aircraft, on the other hand, is equipped with a retractable or fixed rigid probe. To connect the drogue or basket to the probe, the tanker first trails the flexible hose with the drogue or basket. The receiver aircraft then lines up the probe with the drogue or basket before moving forward to plug the probe into the drogue or basket to hook up the connection for fuel transfer.

The boom/receptacle method's main disadvantage is that each tanker can only be equipped with one boom. This is due to the size and weight of the conventional boom, which requires the boom to be designed to occupy a position at the lower aft end of the belly of the tanker aircraft so that the tanker can safely carry the boom. In turn, this means that the tanker can only refuel one receiver aircraft at a time. This issue is amplified when refueling is required for multiple receiver aircraft.

For example, when multiple aircraft are requesting refueling from a tanker using the boom/receptacle method, only one receiver aircraft can be refueled at a time, while the remaining receiver aircraft must "queue up" and wait for their turn. If the first receiver aircraft requires five minutes to connect with and stay "on the boom" to top up its tanks, a flight of four receiver aircraft requires 20 minutes to top up their tanks; by which time the first receiver aircraft would have waited for 15 minutes, resulting in it having consumed 15 minutes worth of fuel, while the second receiver aircraft has consumed 10 minutes worth of fuel, and so on. This problem is exacerbated when there is a high receiver-to-tanker ratio, e.g. eight receiver aircraft per tanker.

For example, in military combat aerial refueling operations, this may result in the fighters having different levels of fuel when the entire flight of fighters completes the refueling. For one fighter in a flight to have significantly lower fuel than the other flight members may result in that fighter having insufficient fuel to complete its subsequent mission, and thus must return to base earlier, reducing the combat effectiveness of the flight.

To mitigate this impact, combat refueling operations will usually require the entire flight to cycle through the tanker again a second time to top up each fighter's tanks. While this ensures that all fighters in the flight have as close to the same fuel state as far as possible, it also means the entire flight will be delayed departing the tanker to perform its mission.

The post-strike refueling situation may be even more critical: fighters coming off-target are likely to be low on fuel, and some may potentially be in "emergency fuel" states, or on the verge of engine flameout. In such situations, the receiver aircraft must expeditiously connect up with the tanker, take on just enough fuel to keep flying for a few more minutes then move aside for the next receiver aircraft; if the first few receiver aircraft took longer than was necessary, those at the end of the queue would have run out of fuel. In these scenarios, the limitation of single-boom tankers and its impact on refueling time becomes pronounced.

A possible way to reduce the overall refueling time is to have more booms available on station, i.e. make more tankers available to reduce the receiver-to-tanker ratio. The refueling operation then becomes determined by the fuel transfer rate, rather than the fuel quantity needs of the receiver aircraft; in other words more tankers are needed than is actually necessary to transfer the required quantity of fuel. This result in less than optimal use of the tankers: it increases the demand on the tanker fleet, and may not be possible when there are a limited number of tankers in an operator's fleet, or in wartime when concurrent operations will place competing demands on the tanker fleet.

The probe/drogue method, on the other hand, cannot be used for refueling receptacle-equipped receiver aircraft, unless the receiver aircraft is modified and/or fitted with a probe. Numerous types of receiver aircraft (e.g. the A-10, F-15, F-16, F-22) are equipped with the boom receptacle, and it would be impractical from a cost or technical perspective to modify these aircraft to incorporate a refueling probe. Typically, the type of refueling system, either the receptacle or probe, installed in a receiver aircraft must be designed in from the start. For cost, weight and technical complexity reasons, it is very rare for a receiver aircraft to have both the receptacle and probe simultaneously, as one system would be unused during a refueling, and therefore constitute "dead weight."

A need therefore exists to provide a solution that seeks to address at least some of the above problems.

SUMMARY

An embodiment of the invention seeks to provide an aerial refueling tanker capable of simultaneously refueling two or more receptacle-equipped receiver aircraft. According to an embodiment of the invention, the receiver aircraft "queue" at the tanker described above would diminish significantly, thereby reducing the delay due to refueling, and potentially enhancing the receiver aircraft flight's chances of mission success. With multiple booms available, multiple receiver aircraft can be refueled at the same time and thus the overall time taken for refueling a flight of multiple receiver aircraft can be shortened. The receiver aircraft can also have similar fuel states since they do not need to queue and be refueled sequentially.

Further, it also means that lesser number of tankers will be required to support the same number of receiver aircraft, or, in other words, the same number of tankers can support more receiver aircraft. In addition, as the tanker according to an embodiment has two or more booms, the tanker will not experience the problem of a single-boom tanker in which refueling operations have to be aborted if the single-boom tanker suffers a boom failure. The multiple booms available on the tanker according to an embodiment provide redundancy to ensure that refueling operations can always be carried out.

According to an aspect of the present invention, there is provided a trailing boom system for aerial refueling, the system comprising a parent pod capable of being connected to a wing or a body of a tanker aircraft and a detachable pod releasable from the parent pod, the detachable pod comprising an extendible boom for refueling a receiver aircraft in flight.

The system may further comprise a tether/fuel hose connecting the parent pod and the detachable pod.

The system may further comprise a fuel transfer module for transferring fuel from the tanker aircraft through the parent pod, the tether/fuel hose, the detachable pod and the extendible boom to the receiver aircraft.

The system may further comprise a flight control module to control the positioning of the detachable pod.

The system may further comprise an automatic collision avoidance module for preventing the detachable pod from colliding with the receiver aircraft.

The system may further comprise a refueling operation control station for a user to interact with the various monitoring and controlling modules of the refueling operation.

The parent pod may comprise guidance means for guiding the receiver aircraft into a position for connection with the extendible boom.

The detachable pod may comprise control surfaces for maneuvering the detachable pod.

The detachable pod may comprise sensors for monitoring the position of the receiver aircraft with respect to the detachable pod.

The parent pod may comprise a housing for receiving the detachable pod when retracted.

The system may further comprise a gimbal mechanism for actuating the boom.

The boom may comprise a telescoping tube within an outer tube.

According to another aspect of the present invention, there is provided a detachable pod for an aerial refueling system, the detachable pod comprising a boom extendible from the detachable pod, the boom suitable for refueling a receiver aircraft in flight and a flight control module for controlling flight control surfaces on the detachable pod to maneuver the detachable pod in flight.

The detachable pod may further comprise a gimbal mechanism for actuating the boom.

The boom may comprise a telescoping tube within an outer tube.

The detachable pod may further comprise an automatic collision avoidance module.

According to another aspect of the present invention, there is provided a method for aerial refueling, the method comprising refueling a aircraft in flight via a boom extendible from a detachable pod, the detachable pod releasable from a parent pod, and the parent pod capable of being connected to a wing or a body of a tanker aircraft.

Refueling may comprise transferring fuel from the tanker aircraft through the parent pod, the detachable pod and the extendible boom to the receiver aircraft.

Transferring fuel from the tanker aircraft through the parent pod to the detachable pod may comprise transferring fuel via a tether/fuel hose connecting the parent pod and the detachable pod.

Prior to the actual refueling, steps comprising of reeling out the detachable pod from the parent pod to a predefined deployed position, guiding the receiver aircraft into a position for connection, flying the detachable pod to a contact position, lowering and extending the boom for connecting to the receiver aircraft, and commencing fuel transfer, take place.

BRIEF DESCRIPTION OF DRAWINGS

Embodiments of the invention will be better understood and readily apparent to one of ordinary skill in the art from the following written description, by way of example only, and in conjunction with the drawings, in which.

DETAILED DESCRIPTION

Overview

Figure 1A:
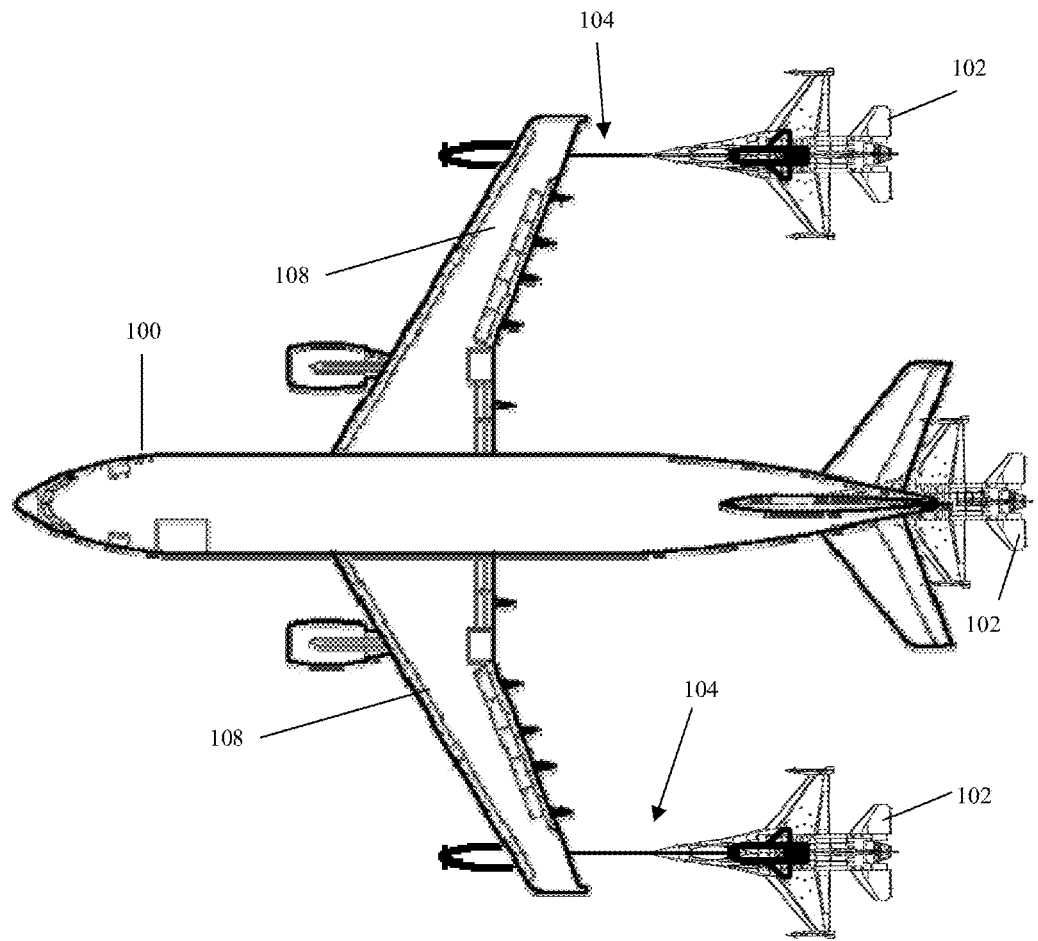
FIGS. 1A and 1B show the top view and the side view of a tanker according to an example embodiment of the present invention.
Figure 1B:
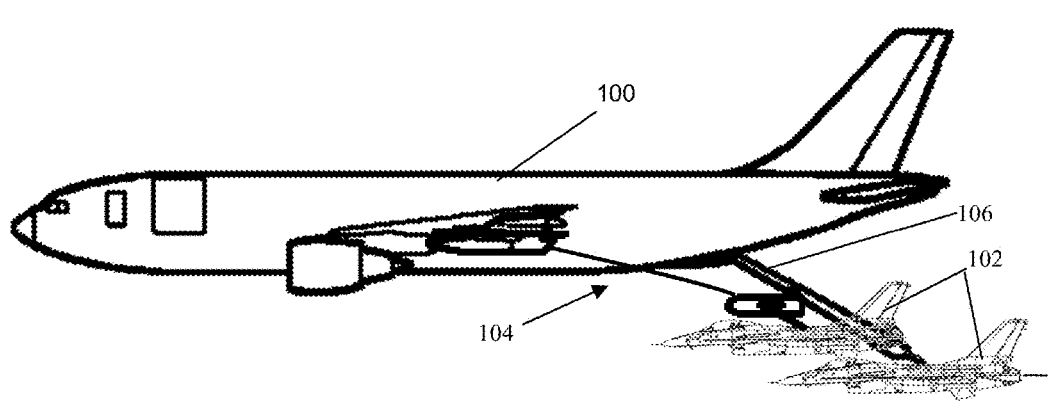

FIGS. 1A and 1B show the top view and the side view of a tanker according to an example embodiment of the present invention. As illustrated in FIGS. 1A and 1B, tanker 100 may be equipped with a trailing boom refueling system 104 on each wing 108 and another conventional fixed refueling boom system 106 at the lower aft belly of the tanker 100. It is understood that variation in the configuration and disposition of the trailing boom refueling system 104 on the tanker 100 may be possible. FIGS. 1A and 1B is provided by way of an example. For example, it may be possible for the tanker 100 to be equipped with a trailing boom refueling system 104 on each wing 108 without the conventional refueling boom system 106 at the lower aft belly of the tanker 100. It may also be possible for the tanker 100 to be equipped with a trailing boom refueling system 104 on each wing 108, and another trailing boom refueling system 104 at the lower aft belly of the tanker 100.

In an embodiment, the trailing boom refueling system 104 on each wing 108 may be configured for connection with a receptacle of receiver aircraft 102. As previously mentioned, conventional aerial refueling for receptacle-equipped receiver aircraft can only be performed via the boom/receptacle method. However, due to the size and weight of the boom, each tanker designed for performing boom/receptacle method for refueling can only carry one boom at the lower aft belly of the tanker. Although a tanker configured for refueling via probe/drogue method carries a hose and drogue on each wing, this drogue is different from a boom and cannot be used to refuel the receptacle-equipped receiver aircraft. Therefore, an embodiment of the present invention exhibits significant advantage over the conventional tanker designed for refueling receptacle-equipped aircraft in that a tanker 100 equipped with multiple trailing boom refueling system 104 for aerial refueling according to an embodiment of the present invention is capable of refueling two or more receptacle-equipped receiver aircraft.

Figure 2A:
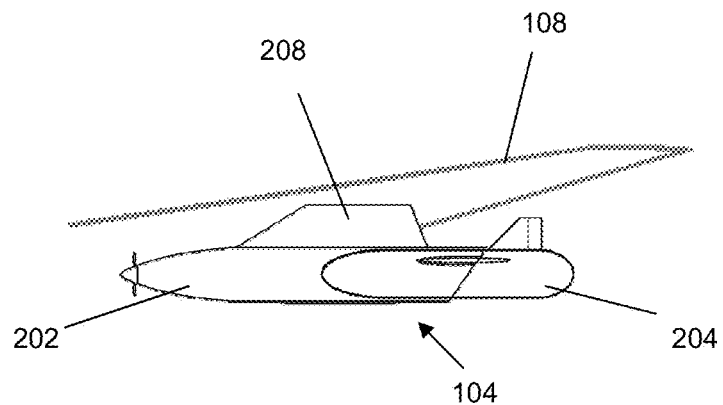
FIGS. 2A, 2B and 2C show the side view of a trailing boom aerial refueling system of the tanker according to an embodiment in a stowed position, a reeled out position and a boom deployed position.
Figure 2B:
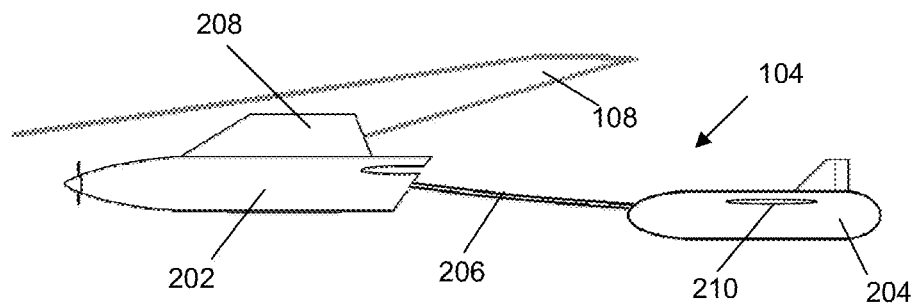
Figure 2C:
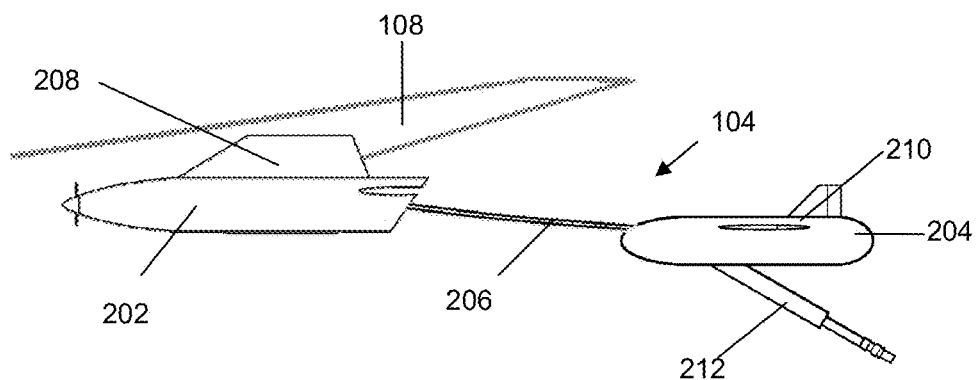

FIGS. 2A, 2B and 2C show the side view of a trailing boom aerial refueling system 104 of the tanker 100 mounted on a wing according to an embodiment in a stowed position, a reeled out position and a boom deployed position. It is understood that the trailing boom aerial refueling system 104 of the tanker 100 may be mounted on the body of the tanker, for example on the lower aft belly of the tanker 100. As illustrated in FIGS. 2A, 2B and 2C, the trailing boom aerial refueling system 104 may be suspended on the underside of each wing 108. It is understood that the refueling system 104 may be suspended on the underside of the body or the belly of the tanker 100. The trailing boom refueling system 104 may include a parent pod 202 capable of being connected to a wing 108 or a body of an aircraft and a detachable pod 204 comprising an extendible boom 212 for refueling aircraft in flight. The detachable pod 204 may be connected to the parent pod 202 via a tether/fuel hose 206. As shown in FIGS. 2A, 2B and 2C the parent pod 202 may be mounted on a pylon 208, which in turn may be mounted on a hardpoint of the wing 108. It is understood that the parent pod 202 may be mounted on the wing 108 or the body via other suitable mounting means.

As shown in FIG. 2A, in the stowed position, a front portion of the detachable pod 204 may be lodged inside a hollow aft portion of the parent pod 202. The detachable pod 204 may be secured in this stowed position via various securing means. It is understood that variations in the manner the detachable pod 204 is lodged and secured in the parent pod 202 such that is it stowed in the parent pod 202 are possible. FIG. 2A is provided by way of an example.

In FIG. 2B, the detachable pod 204 is in a reeled out position. To reel out the detachable pod 204, the detachable pod 204 may first be unlatched from the parent pod 202 into the airstream below and behind the wing 108. The detachable pod 204 may then be trailed from the parent pod 202 by a tether-cum-fuel hose 206, which may be attached to the detachable pod 204 via a flexible/articulated coupling. It is understood that variations in the method and the components used to reel out and trail the detachable pod 204 from the parent pod 202 may be possible. It is also understood that variations in the type of tethering means and coupling means may also be possible. FIG. 2B is provided by way of an example.

Figure 3:
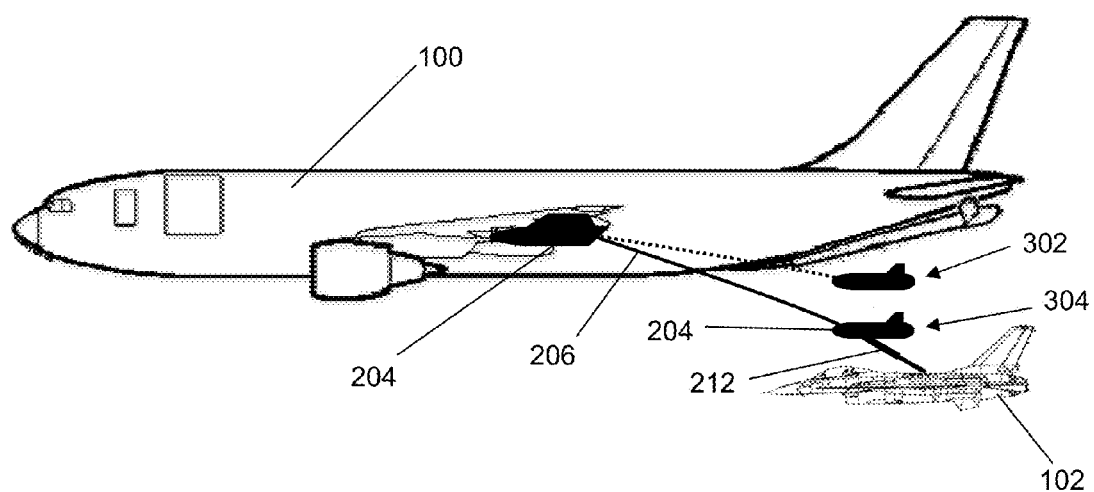
FIG. 3 illustrates an example of the deployed position and the contact position of the detachable pod.

The detachable pod 204 may be a miniature flying vehicle, with wings 210 to generate lift, and flight control surfaces to affect its trajectory in the roll, pitch and yaw axes. Through controlling aerodynamic characteristics, the detachable pod 204 may be able to position itself at any point within a fixed volume of space relative to its carrier, the tanker aircraft 100. The detachable pod 204 may maintain stable flight using an automatic flight control module (not shown) such that it may maintain a predefined position relative to the tanker 100. The predefined position relative to the tanker 100 is also known as the deployed position 302 (FIG. 3). The deployed position 302 may be a position that is considered to be a safe distance between the receiver aircraft 102 and the tanker 100 during the aerial refueling operation. For different receiver aircraft 102 types, due to the difference in the location of the aerial refueling receptacles, the deployed position 302 may be different. An aerial refueling operator (ARO) may select the type of receiver aircraft to be refueled (e.g. F-15, F-16 or F-35) on a refueling control station for the automatic flight control module of the detachable pod 204 to fly the detachable pod 204 into the deployed position 302. It is understood that variations in the features, method and module for flight control of the detachable pod 204 may be possible. FIG. 2B is provided by way of an example.

The detachable pod 204 may also contain a fuel flow control pump/valve (not shown) and/or a truncated version, which are functionally equivalent to that found in the boom of a conventional tanker configured for refueling via the boom/receptacle method, for controlling the fuel transfer. It is understood that variations in the fuel flow control pump/valve may be possible. The above is provided by way of an example.

After being reeled out from the parent pod 202 as shown in FIG. 2B, the detachable pod 204 may be controlled via the various features, methods and modules for flight control such that the detachable pod 204 may maintain a stable flight in the predefined deployed position 302. When the detachable pod 204 is at the deployed position 302, the receiver aircraft 102 may approach the tanker 100, similar to the way it would approach the boom of a conventional tanker configured for refueling via boom/receptacle method. The receiver aircraft 102 may be guided into position below/behind the tanker wing 108 by rows of director lights 502, 504 (FIG. 5) on the bottom of the parent pod 202. These director lights may be similar to the director lights 502, 504 found fitted under the fuselage of a conventional tanker. These director lights 502, 504 may be field-of-view limited to eliminate the risk of providing erroneous directions to receiver aircraft 102 approaching the detachable pod 204 on each wing 108. It is understood that variations in the features and method for directing the receiver aircraft 102 to the detachable pod 204 may be possible. The example provided above is by way of an example only.

An embodiment of the trailing boom aerial refueling system 104 of the tanker 100 may further include an automatic collision avoidance module for monitoring and taking avoidance action to prevent the detachable pod 204 and the receiver aircraft 102 from colliding. While in the deployed position, the automatic collision avoidance module may continuously monitors the approach of the receiver aircraft 102 for possible collision via proximity sensors 620 (FIG. 6) fitted on the detachable pod 204. If the detachable pod 204 through its proximity sensors 620, 622 detects a risk of collision, the automatic collision avoidance module may control the detachable pod 204 to fly up to a higher and safer position, or be reeled back in if necessary. It is understood that variations in the configuration, algorithm, components and method of implementing the automatic collision avoidance module and the type of sensors used to determine the position of the receiver aircraft 102 may be possible. The above is provided by way of an example.

An embodiment of the trailing boom refueling system 104 of the tanker 100 may further include a position monitoring module in the detachable pod flight control module for monitoring the relative position of the receiver aircraft 102 from the detachable pod 204. The proximity sensors 620 may be provided on the detachable pod 204 to monitor and/or determine the relative position of the receiver aircraft 102 from the detachable pod 204. When the position monitoring module has established that the receiver aircraft 102 is in position for hooking up for fuel transfer, the module may send a signal to the refueling control station to inform the ARO to initiate the next phase of the aerial refueling operation. It is understood that variation in the configuration, algorithm, components and method of implementing the position monitoring module and the sensors used to determine the position of the receiver aircraft 102 may be possible. The above is provided by way of an example.

The detachable pod 204 may further include an extendable boom 212, as shown in FIG. 2C, for connecting to the receptacle of the receiver aircraft 102. After the refueling control station informs the ARO that the receiver aircraft 102 is in position for connection, the ARO may initiate the refueling control station to lower the detachable pod 204 into a contact position 304. The contact position 304 may be a predefined position, specific for the receiver aircraft type, in which the detachable pod 204 may extend the boom to connect with the receiver aircraft. FIG. 3 illustrates an example of the deployed position 302 and the contact position 304 with the boom 212 extended and in connection with the receiver aircraft 102. It is understood that variation in the deployed position 302, contact position 304 and the extendable boom 212 may be possible. FIGS. 2C and 3 are provided by way of example.

An embodiment of the trailing boom aerial refueling system 104 of the tanker 100 may further include a position verification module for the ARO to verify that the receiver aircraft is in position for connection with the detachable pod 204 in the contact position 304. The detachable pod 204 may be provided with a laser light source and a camera. The laser light source may direct laser spots on the receiver aircraft 102. The lasers may use eye-safe wavelengths. The camera may provide visual feedback to the ARO. The ARO may verify the relative position of the receiver aircraft 102 from the visual feedback by observing the position of the laser spots on the receiver aircraft 102. It is understood that variation in configuration, algorithm, components and method of implementing the position verification module and the method of verifying the position of the receiver aircraft 102 may be possible. The above is provided by way of example.

When the ARO determines that all safety criteria are met and it is safe to proceed, the ARO may control the detachable pod 204 to lower and telescopically extend the boom 212 to connect with the receptacle of the receiver aircraft 102 via the refueling control station. When the boom nozzle engages the receiver's receptacle, an opposite reaction force tends to push the boom 212 back out. The detachable pod 204 may include an aerodynamic spoiler 612. The opposite reaction force that tends to push the boom 212 back out may be countered by a down/backwards force created by the aerodynamic spoiler. The down/backwards force may resist the reaction force and allow positive engagement of the boom and receptacle. The aerodynamic spoiler may be automatically deployed when the boom 212 is extending for connection. Automatic deployment of the aerodynamic spoiler may be controlled by the automatic flight control system based on input from the proximity sensors 620, 622 and the boom extended length data. It is understood that variation in the aerodynamic spoiler, the method of deploying the spoiler and the method of countering the reaction force may be possible, the above is provided by way of example.

When the boom 212 has made a positive connection with the receptacle of the receiver aircraft 102, fuel transfer may commence automatically, or may be manually controlled. During refueling, the ARO may continuously monitor the position of the receiver aircraft 102 via the refueling control station and the position verification module. If the receiver aircraft 102 deviates too much from the optimum position envelope and poses a risk to itself or the detachable pod 204, visual and/or aural warnings may be provided to the receiver aircraft pilot and/or the ARO. The aerial refueling operation may be aborted by disengagement of the boom 212 followed by flying the detachable pod 204 to a safe position. It is understood that variations in the method and module for detecting the above risks and the type of warnings provided may be possible. The above is provided by way of an example.

Upon completion of the fuel transfer, the ARO may disconnect the boom 212 from the receiver aircraft 102, retract the boom 212, and stow the boom 212. The receiver aircraft 102 may fly clear of the detachable pod 204, to allow the detachable pod 204 to return to deployed position 302. The above is provided by way of an example. It is understood that disconnection may also be initiated by the receiver aircraft's pilot instead of the ARO. For example, the pilot may request the ARO to initiate the disconnection. It may also be possible for the pilot to fly his aircraft 102 and drag the detachable pod 204 outside of the safe operating envelope, triggering the detachable pod flight control module's built-in safety feature that automatically disconnects the boom 212.

After the receiver aircraft 102 has completed aerial refueling, subsequent receiver aircraft 102 may then fly into position, after being cleared by the ARO, for refueling by repeating the process as described above. On completion of the entire refueling session, the ARO may control the reeling back of the detachable pod 204 and stowing of the detachable pod 204 into the parent pod 202.

Parent Pod

Figure 4:
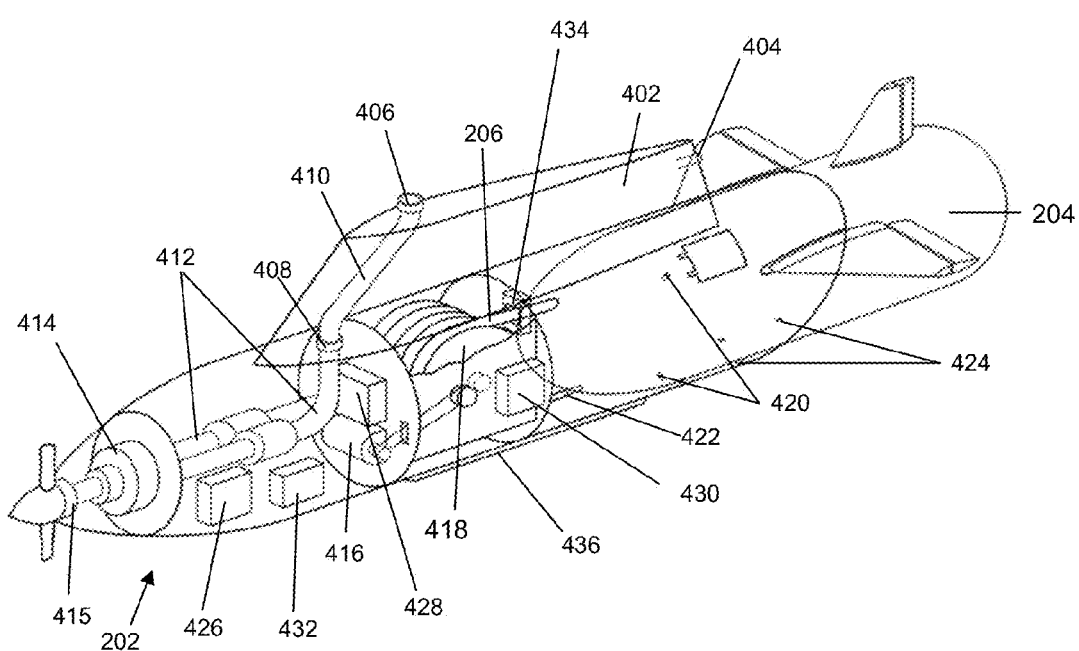
FIG. 4 illustrates a parent pod according to an embodiment of the present invention.

FIG. 4 illustrates a parent pod 202 according to an embodiment of the present invention. The parent pod 202 may be custom built or converted from existing multi-point refueling system (MPRS) pod designs that deploy hose/drogues from multi-point capable tankers configured to provide aerial refueling via the probe/drogue method.

The parent pod 202 according to an embodiment may be an aerodynamic shell that may be suspended via a pylon 402, attached to a hard-point on the tanker's wing. At the aft of the pylon 402, an aft looking camera and/or laser range finder 404 may be mounted. The aft looking camera and/or laser range finders 404 may be used to acquire/track both the receiver aircraft 102 and detachable pod 204. They may provide real-time feedback to the ARO on the relative positions of both the receiver aircraft 102 and detachable pod 204. The ARO may utilize the real-time feedback from the aft looking camera and/or laser range finder 404 and sensors 620 on the aft portion of the detachable pod 204 to manually provide initial guidance via director lights 502, 504 to the receiver aircraft's pilot for maneuvering the receiver aircraft 102 close to the detachable pod 204. When the receiver aircraft 102 is close to the detachable pod 204, the position monitoring module in the detachable pod flight control module may take over monitoring of the receiver aircraft's position and automatically generate guidance cues via the director lights 502, 504 for guiding the receiver aircraft 102 into the desired position. It is understood that variation in the type and disposition of the aft looking camera and/or laser range finder 404 may be possible.

For example, these sensors may be located in the trailing edge of the parent pod 202 mounting pylon 402, or on the undersurface of the parent pod shell 436.

On the pylon 402, a fuel line connection 406 for connecting the fuel line 410 in the pylon 402 to the fuel source (not shown) in the tanker's wing 108 may be located on the surface of the pylon 402 in which the pylon 402 may be mounted to the tanker's wing 108. On the opposite surface of the pylon 402 in which the parent pod 202 is mounted to the pylon 402, a second fuel line connection 408 may be located for connecting the fuel line 410 in the pylon 402 to the fuel piping 412 in the parent pod 202. The parent pod 202 may include a fuel pump 414 in the form of a centrifugal pump for pumping fuel from the tanker's internal fuel tanks into the fuel piping 412 in the parent pod 202, and subsequently from the parent pod 202 to the detachable pod 204 via fuel hose 206.

The parent pod 202 may include a ram air turbine 415 at the front portion of the parent pod 202 for generating electrical and/or mechanical power for the various components in the parent pod 202, such as the fuel pump 414, hose drum motor 206, external lighting, as well as for the components in the detachable pod 204. The parent pod 202 may utilise any combination of electrical, hydraulic and fueldraulic power for the various pumps and motors.

The parent pod 204 may include a drum 418 for stowing and reeling out a tether/fuel hose 206. The tether/fuel hose 206 may be connected to the fuel piping 412 of the parent pod 204 at one end, and may be connected to the detachable pod 204 at the other end. This tether/fuel hose 412 may be more robust than a conventional hose used in the probe/drogue method, because the detachable pod 204 may be heavier than a drogue, albeit having a shorter deployed hose length than the drogue's hose.

The rear portion of the parent pod 202 may have a semi-recessed configuration for housing the detachable pod 204. Mechanical stops 420 may be used to secure the detachable pod 204 to the parent pod 202. These mechanical stops 420 may be positioned at the 1:30/4:30/7:30/10:30 o'clock positions of the parent pod 202 cavity housing the detachable pod 204. It is understood that other positions may be possible. The mechanical stops 420 may be electrically operated, and may fit into recesses on the detachable pod 204 airframe to restrain it from movement.

The detachable pod 204 may be deployed via retraction of the mechanical stops 420 and rotation of the hose reel drum 418. A linear deployment ram 422 may be added to aid the reel drum 418 in deploying the detachable pod 204 from the parent pod 202. Reeling-in/stowage of the detachable pod 204 may be accomplished by rotating the hose reel drum 418 in the reverse direction. Rollers 424 and Teflon padding may be installed around the periphery of the parent pod 202 housing cavity, to reduce friction during deployment and stowage of detachable pod 204.

The parent pod 202 may also include one or more electronic control units to provide feedback and control to a refueling control station of the tanker 100 for the ARO to monitor and control various components of the parent pod 202. For example, the parent pod 202 may include a parent pod control unit 426, a motor control unit 428, and a BIT/maintenance control panel 430. In addition, the parent pod 202 may include a power supply 432 for providing power to the various components of the parent pod 202.

Further, the parent pod 202 may include a hose guillotine and jettison module 434 for providing an emergency breakaway means such that the detachable pod 204 may be cut loose and released in an emergency situations, for example when the detachable pod 204 cannot be reeled back in and stowed due a systems failure, which may affect the safe landing of the tanker, or may be hazardous to the people/property on the ground below.

It is understood that variation in the type, configuration, arrangement and components in the parent pod 202 may be possible. FIG. 4 is provided by way of example.

Figure 5:
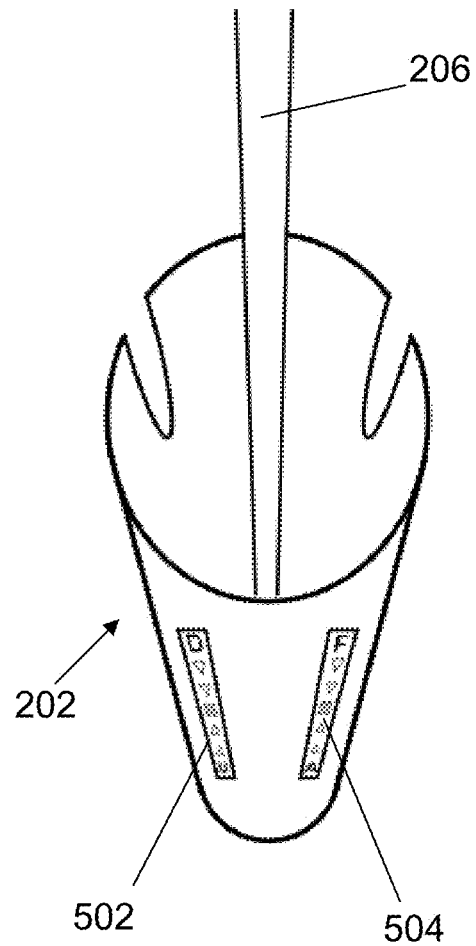
FIG. 5 shows a receiver aircraft's perspective view of the parent pod with two rows of red/green receiver director lights on the bottom of the parent pod.

FIG. 5 shows a receiver aircraft's 102 perspective view of the parent pod 202 with two rows of red/green receiver director lights 502, 504 on the bottom of the parent pod 202 to guide the receiver aircraft's pilot to maneuver the receiver aircraft 102 into an optimum position within the operating envelope of the detachable pod 204. The director lights 502, 504 may guide the receiver aircraft 204 into a position for connection with the extendible boom 212. The first row of director light 502 may be a series of up/down director light indicating to the pilot of the receiver aircraft 102 to adjust the altitude of the receiver aircraft 102, i.e. to move up or down. The second row of director light 504 may be a series of forward/aft director light indicated to the pilot of the receiver aircraft 102 to maneuver the receiver aircraft 102 forward or aft. These director lights 502, 504 may direct the receiver aircraft's 102 pilot to move up/down and/or forward/aft so that the receiver aircraft 102 may be in the optimum position for connection with the boom 212. It is understood that variation in the type, configuration and arrangement of the director lights 502, 504 may be possible. For example, these director lights 502, 504 may be similar to the lights on the fuselage of a conventional (e.g. KC-10 and KC-135) or new generation (e.g. KC-30 and KC-767) tanker configured for boom/receptacle refueling method. FIG. 5. is provided by way of an example.

Detachable Pod

Figure 6:
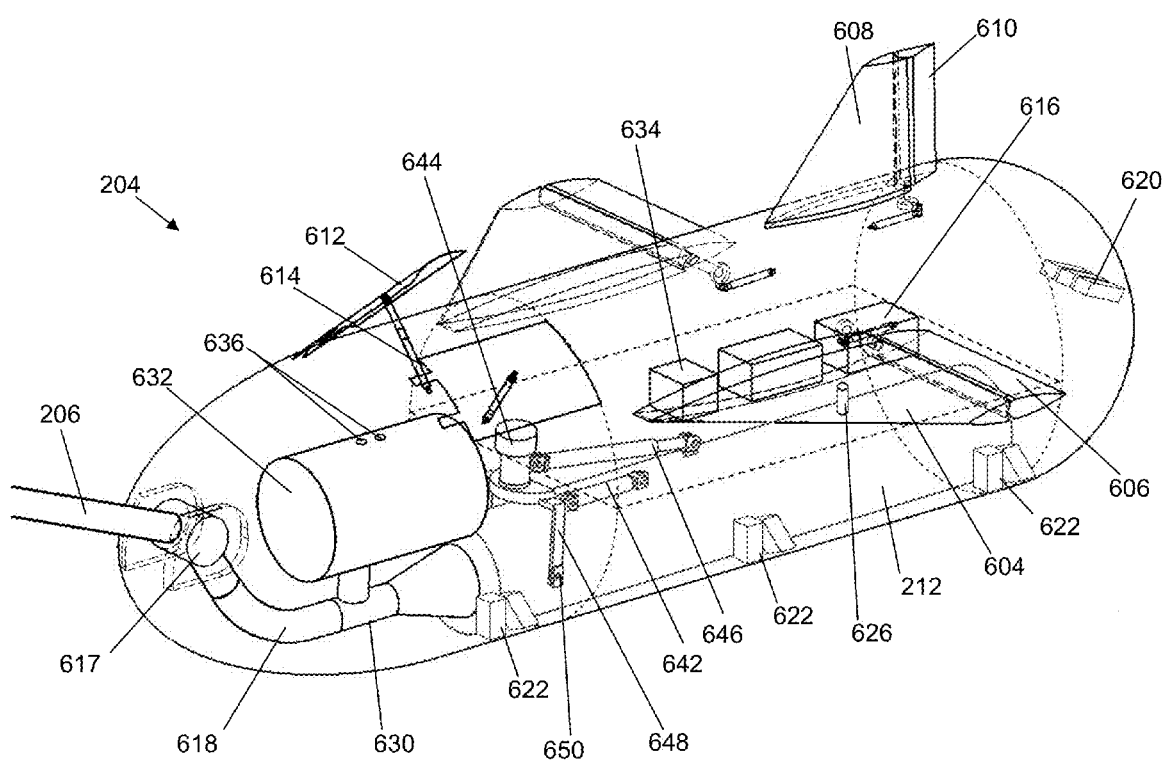
FIG. 6 illustrates a detachable pod according to an embodiment of the present invention.

FIG. 6 illustrates a detachable pod 204 according to an embodiment of the present invention. The detachable pod 204 may be a tethered flying device, towed by the tether/fuel hose 206, and has an extendible refueling boom assembly 212 that interfaces with the receiver aircraft 102. The detachable pod 204 airframe may include small wings 604 to generate lift in addition to the lift generated by the body to support the weight of the detachable pod 204. The wing control surfaces (elevators/ailerons) 606 may be electrically actuated and operated in unison to control pitch and differentially to control roll. A vertical fin 608 with an electrically actuated rudder 610 may provide directional stability and yaw control. A pair of small spoilers 612 may provide vertical attitude control, and also functions as speed brakes, to counteract the reaction force from the boom/receptacle engagement. The spoiler actuators 614 may be electrically operated. These flight control surfaces may be controlled and utilized either singly or in combinations to maneuver the detachable pod 204 into the deployed position 302 and/or the contact position 304 for connection with the receiver aircraft 102. The detachable pod 204 may include a flight control module for controlling these flight control surfaces to maneuver the detachable pod 204 in flight.

In an embodiment, the flight control module may include a digital flight control computer 616. The digital flight control computer 616 within the detachable pod 204 may provide control authority over the detachable pod 204 when in flight. The digital flight control computer 616 may automatically control the operation of the flight control surfaces, such as the wing 604, the vertical fin 608 and the spoiler 612. Upon receiving an input via the refueling control station from the ARO regarding the type of receiver aircraft 102 to be refueled, an appropriate digital flight control algorithm may be activated to fly the detachable pod 204 into the appropriate contact position 304.

The tether/fuel hose 206 from the parent pod 202 may attach to the detachable pod 204 via a structural fitting/flexible coupling 617, which is in turn connected via fuel piping 618 to the refueling boom assembly 212. Electrical power, sensor and communication/video lines between the parent pod 202 and the detachable pod 204 may also run parallel with the tether/fuel hose 206.

An embodiment of the detachable pod 204 may include the sensors 620, such as laser range-finding/proximity warning sensors and video cameras, on the aft portion of the detachable pod 204 for looking downwards and aft-wards at the approaching receiver aircraft 102. The detachable pod 204 may also include sensors 622, such as vertical/30° angle laser range finder/proximity warning sensors and video cameras, along the bottom belly of the detachable pod 204. These sensors 620, 622 may provide feedback on the receiver aircraft's approach to the digital flight control computer 616, which control the detachable pod's 204 control surfaces to maintain position of the detachable pod 204 when the receiver aircraft 102 is approaching the detachable pod 204 for joining up. The sensors 620, 622 may also provide means for collision detection when the receiver aircraft 102 is approaching too close or too fast, which may trigger preprogrammed automatic collision avoidance module for taking safety maneuvers. This function is described further in the Operation Control section below.

The video images from the sensors 620, 622 may be displayed to the ARO aboard the tanker 100. To facilitate verification of alignments, two visible laser beams of different colors may be projected from the sensors 620, 622 of the detachable pod 204 onto the receptacle on the receiver aircraft 102. The laser spots on the receptacles converge only if the attitude of the detachable pod 204 and relative position with the receiver aircraft 102 is correct. The relative height between the pod and the receiver aircraft is obtained by resolving via calculation the distance data measured from the proximity sensors 620, 622. The detachable pod 204 may then establish a relative height-hold mode. When the display shows the receiver aircraft 102 is in the correct position relative to the detachable pod 204, the ARO may activate boom deployment and extension to connect the boom 212 with the receiver aircraft 102.

The digital flight control computer 616 may also determine the right moment, from the distance data measured by the proximity sensors 620, 622 and boom lowered angle/telescoped extended length, to deploy the spoiler 612 for counteracting the reaction force when the boom nozzle contact with the receptacle of the receiver aircraft 102.

Figure 9:
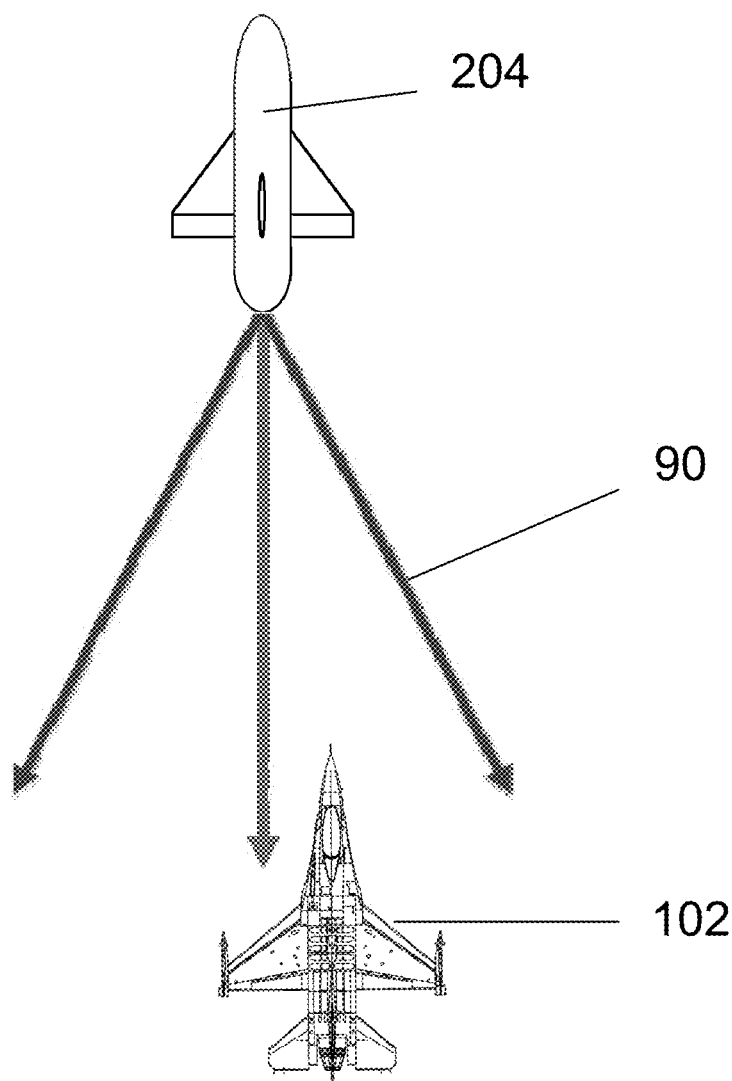
FIG. 9 shows a cone-shaped coverage provided by the sensors of the detachable pod according to an embodiment of the present invention.

In an embodiment of the detachable pod 204, sensors 620 may include three proximity sensors disposed such that they may provide a cone-shaped coverage 902 of the receiver aircraft's position. FIG. 9 shows the cone-shaped coverage 902 provided by the sensors 620 of the detachable pod 204. This configuration of sensors 620 may provide greater precision position measurements of the receiver aircraft's position. This position information may be fed into the digital flight control computer 616 for controlling the control surfaces of the detachable pod 204 so that the detachable pod 204 is able to maintain a precise position from the receiver aircraft.

In an embodiment, to safely maintain the detachable pod's position from the tanker 100 when the tanker 100 maneuvers, information such as bank angle and airspeed data from the tanker 100 may be fed as inputs to the detachable pod's digital flight control computer 616. Alternatively, extra laser range-finders may be installed and employed on the detachable pod 204 to look upwards and forwards at the tanker 100 so as to measure its position with respect to the tanker 100. Information from the extra laser range-finders may be fed as input to the detachable pod's digital flight control computer 616. The digital flight control computer 616 may then control the detachable pod 204, via the control surfaces, to provide corresponding maneuvers for the detachable pod 204 to remain safely deployed as the tanker 100 maneuvers.

The boom assembly 212 may be stowed in the detachable pod 204 with mechanical latches 626. Upon release of the mechanical latches 626, the boom assembly 212 may be able to rotate down from the stowed position, through a longitudinal opening in the detachable pod's underside, via an actuated gimbal mechanism that allows it to rotate in two axes—down/up 40° and left/right 10°. The gimbal mechanism may include a boom pivot fitting 644 and boom transverse actuator 642 configured such that the boom assembly 212 may rotate laterally left/right 10° about the axis of the boom pivot fitting 644. The gimbal mechanism may also include a boom fork 648 attached to the boom pivot fitting 644 and a boom deploy/retract actuator 646 configured such that the boom assembly 212 may rotate down/up 40° about the pivot joint 650 in which the boom assembly 212 is connected to the boom fork 648. The lateral rotation range is limited as the primary means of lateral aligning the boom assembly 212 with the receiver aircraft's receptacle is by maneuvering the detachable pod 204 into position, rather than the boom assembly 212. Minor angular adjustments of the boom assembly 212 for fine-alignment with the receptacle may still be provided by the lateral rotation which can be made by the ARO, using a joystick controller at the Refueling Control Station. The joystick commands would be processed by the digital flight control computer 616 and transmitted to the boom actuators.

The boom actuation mechanism 642, 646 may use electro-hydrostatic actuators (EHAs) to lower/raise the boom assembly 212, and to rotate it left/right. EHAs are self-contained actuators that operate solely by electrical power. Electrical power is applied to the EHAs to maneuver the boom assembly 212. After the boom assembly 212 makes contact with the receiver aircraft's receptacle, electrical power to the EHAs will be cut off to relieve hydraulic pressure. The EHA may be designed to allow free movement of the actuator 642, 646 when electrical power is cut off or enter a mode that allows such free movement. This is to enable the gimbal mechanism to function as a flexible joint, preventing excessive loads from being transmitted to the pod, which may occur with a rigid joint. Upon completion of refueling, after the boom assembly 212 disconnects from the receptacle, electrical power is re-applied to the EHAs, such that positive control of the boom assembly 212 is regained for centering and raising of the boom assembly 212 for stowage.

Figure 10:
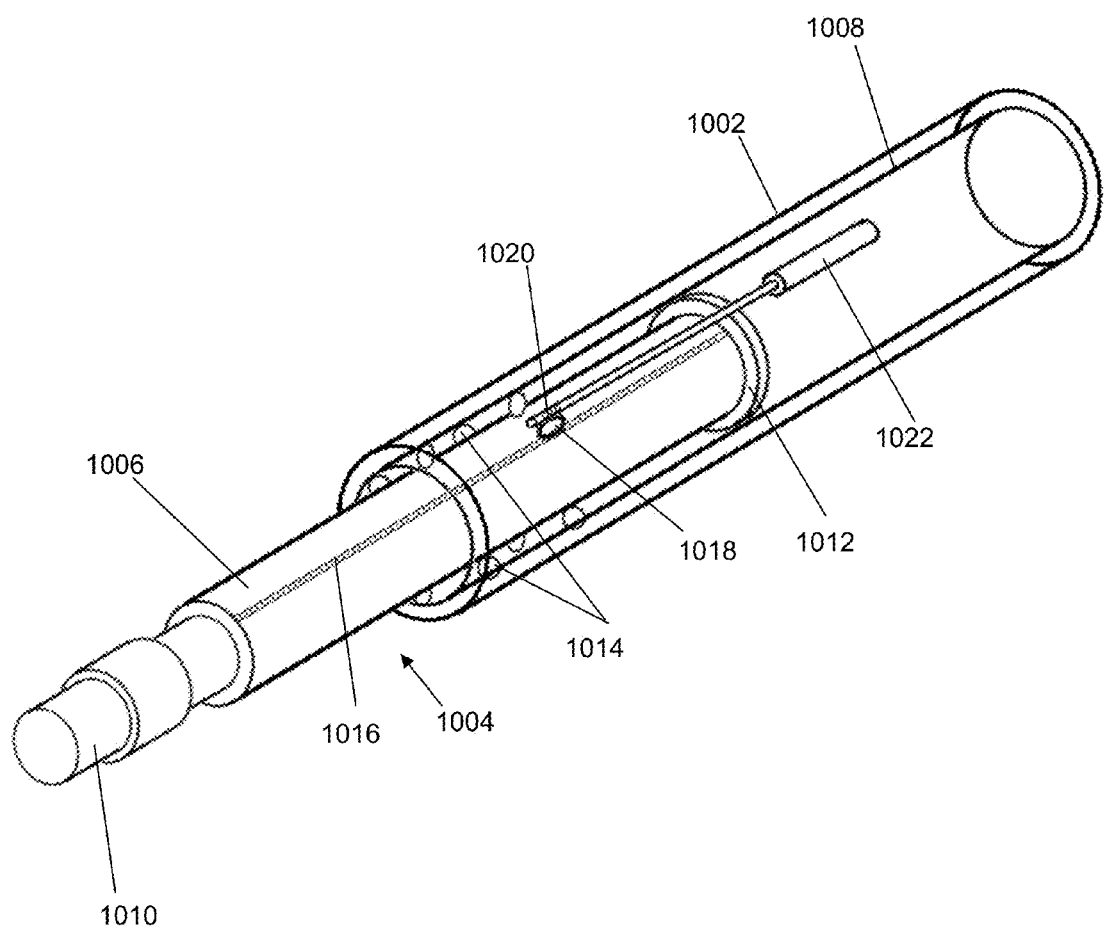
FIG. 10 shows a boom of the detachable pod according to an embodiment of the present invention.

FIG. 10 shows a boom assembly 212 of a detachable pod 204 according to an example embodiment of the present invention. The boom assembly 212 may include two tubes, a telescoping tube 1004 within an outer tube 1002. The outer tube 1002 may be an aerodynamic fairing. The inner telescoping tube 1004 may be a fuel tube with a nozzle 1010 mounted at its end via a shock absorbing mount. The fuel tube may also include an inner 1006 and outer tube 1008; the sliding of the inner tube 1006 within the fixed, outer tube 1008 may provide the telescoping action. A sliding gland seal 1012 at the end of the inner tube 1006 may prevent fuel leakage during the telescoping action. The inner tube 1006 may be supported centrally by a series of rollers 1014 around its periphery, which are mounted along the "dry" portion of the outer tube 1008. The extension/retraction mechanism may be in the form of a rack 1016 and pinion 1018, with the rack 1016 being on the surface of the inner tube 1006; the pinion 1018 may in turn be connected by a worm gear or bevel gear 1020 to the electrical motor 1022. In another embodiment, the mechanism may be a roller driven by a wheel, chain and sprocket, powered by a motor. In yet another embodiment, EHAs may also be used.

The nozzle design may incorporate flexibility which may be required when making contact and when the tanker 100 and receiver aircraft 102 are hooked up. In an embodiment, the flexibility may be provided by the incorporation of a ball joint swivel and a universal joint. A spring-activated check valve may be installed at the aft end of the nozzle to form the fuel seal. This valve is automatically depressed during the coupling operation by the receiver aircraft's receptacle assembly.

The detachable pod airframe may be constructed of standard aerospace structural materials such as aluminium alloys, or carbon fiber composites. The detachable pod 204 dimensions may be mainly dictated by the need for adequate clearance between the detachable pod 204 and receiver aircraft 102 type, e.g. F-16, which has the lowest clearance among possible fighter receivers.

In an embodiment the parent pod 202 may be approximately 20.4 ft (6.3 m) long with a 38 in. (0.97 m) diameter. It may weigh approximately 1200 lbs (545 kg). The detachable pod 204 may be approximately 14 ft (4.3 m) long with a 32 in. (0.82 m) diameter. It may weigh approximately 500-550 lbs (225-250 kg). The maximum boom 108 length may be approximately 11.5 ft (3.5 m).

It is understood that variation in the type, configuration, arrangement and components in the detachable pod 204 may be possible. FIG. 6. is provided by way of example.

Refueling Control Station

In an embodiment, the trailing boom refueling system 104 of the tanker 100 may include a refueling control station (not shown) for centralized control of the aerial refueling operation. This refueling control station may be operated by the ARO for communication with the crews of the tanker 100 and receiver aircraft 102. The ARO may handle refueling operations from this refueling control station. These operations may be:

a. System health check for parent pods and detachable pods.
b. Deployment and retraction of detachable pods.
c. Activation/deactivation of fuel transfer.
d. Coordination with tanker and receiver aircraft.
e. Emergency abort.
f. Jettisoning of detachable pods during an emergency.
g. Identifying and designating receiver aircraft for tracking by the system.
h. Verification and consent for maneuvering the detachable pod to pre-contact position.
i. Verification and consent for the ARO to lower and extend the boom.

Fuel Transfer Module

An embodiment of the trailing boom refueling system 104 of the tanker 100 may further include a fuel transfer module for transferring fuel from the tanker's internal fuel cells through the parent pod 202, the tether/fuel hose 206, the detachable pod 204 and the extendible boom 212 to the receiver aircraft 102. The fuel transfer module may include a centrifugal fuel pump 414 on the parent pod 202 that is powered by the ram air turbine 418. Fuel may be pumped from the fuel piping in the tanker 100 through the fuel piping 412 and valves within the parent pod 202 up to the tether/fuel hose 206. Fuel in the tether/hose 206 may be pumped into the detachable pod 204 through a flexible coupling 616 at the front of the detachable pod 204, through a valve assembly 630 and another flexible coupling at the pivoting joint of the refueling boom assembly 212. When the nozzle engages the receptacle, the poppet valve will open, allowing fuel to be transferred to the receiver aircraft 102.

Figure 7A:
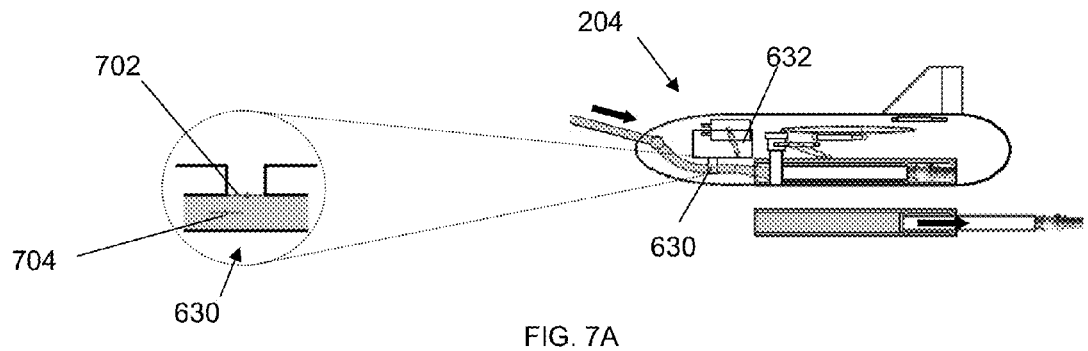
FIG. 7A-7D illustrate examples of the fuel flow, valve and backflow reservoir's operation in the detachable pod.
Figure 7B:
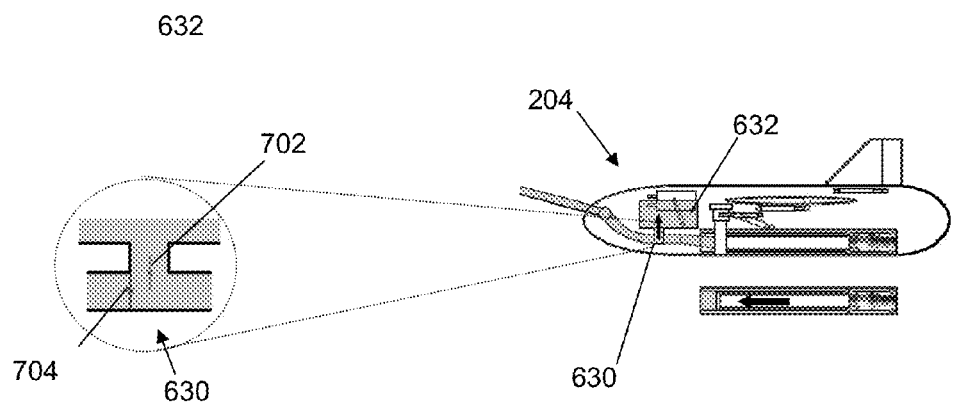
Figure 7C:
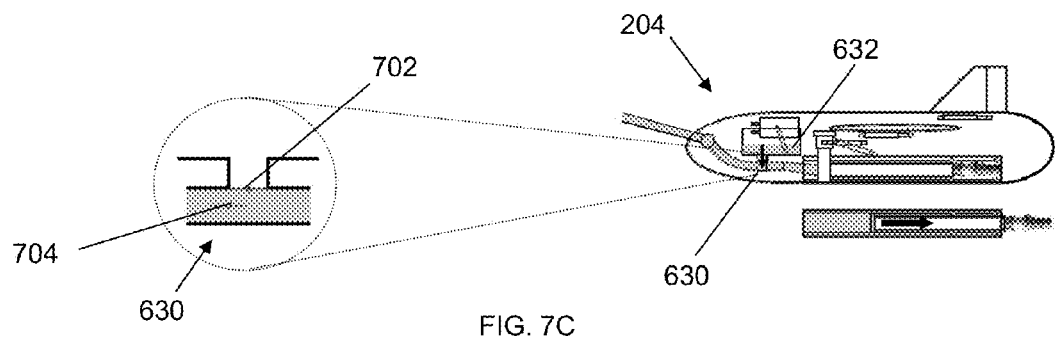
Figure 7D:
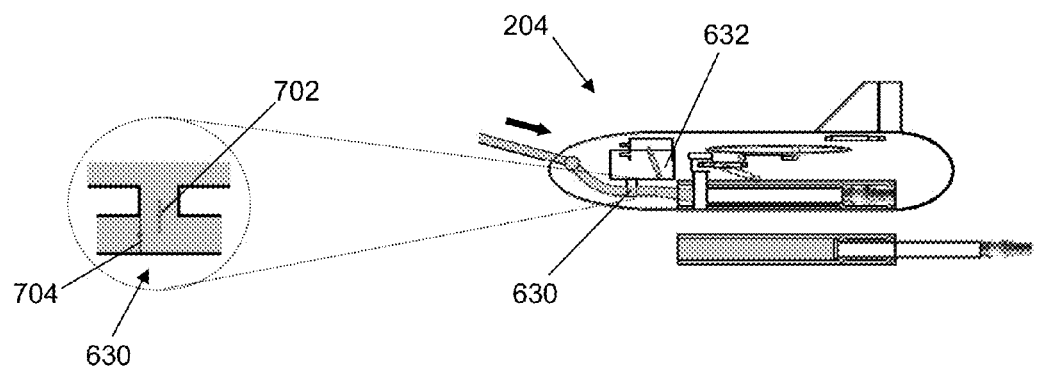

The valve assembly 630, as shown in FIG. 7A-7D, may include two butterfly valves 702, 704 to control fuel flow. When fuel transfer to the receiver aircraft 102 is to take place, the valves may operate such that fuel from the tether/hose 206 flows directly to the boom 212, bypassing the backflow reservoir 632, as shown in FIG. 7A. On completion of fuel transfer, the boom 212 needs to be retracted, but this may be difficult to accomplish against the weight and pressure of fuel already in the internal fuel line 618 and tether/hose 206. To facilitate boom retraction, the valves 702, 704 may operate such that they isolate the upstream fuel from the tether/hose 206, while opening the line to the backflow reservoir 632, as shown in FIG. 7B. When the boom retracts, it may push the fuel inside its fuel tube 618 into the backflow reservoir 632. The fuel remains inside the backflow reservoir 632 until the boom 212 is extended again, whereupon the fuel in the backflow reservoir 632 flows back into the boom 212, as shown in FIG. 7C. When fuel transfer is activated again, the valves 702, 704 return to the positions that allow fuel to flow directly from the tether/hose 206 to the boom 212, as shown in FIG. 7D. Fuel remains in the backflow reservoir 632 at the conclusion of the refueling operation, when the boom 212 is stowed. The backflow reservoir 632 may be equipped with air pressure equalisation valves 636 (FIG. 6) for the inflow and outflow of fuel. In an embodiment, these air pressure equalization valves may be simple hinged, spring-loaded valves. The fuel flow, valve and backflow reservoir's operation illustrated in FIG. 7 is provided by way of an example. It is understood that other configurations, methods and components for the fuel flow, valve and backflow reservoir's operation may be possible.

The tether/fuel hose 206 construction may be based on existing designs. An inner rubber tube may contain the fuel; a middle braided steel sleeve may provide the main structural strength for the hose, and an outer rubber sheath may provide environmental and impact protection. The internal diameter of the fuel tube may be approximately 3 in. (7.62 cm), or may be sized accordingly to fuel flow requirements. The maximum extended hose trail length may be approximately 70 ft (21.4 m); actual deployed length may depend on the tanker type, to maximise lateral clearance between the receiver aircraft and tanker's horizontal stabiliser. 70 ft (21.4 m) may be applicable to the KC-30, while 55 ft (16.8 m) may be sufficient for the smaller KC-767.

The centrifugal fuel pump may be operating at pressures of 50 psig (450 kpa) to deliver fuel at a rate of about 3,800 lbs (1,725 kg)/min with this size of hose. This may be more than sufficient for the F-15 fuel take-on rate 3,400 lbs (1,550 kg)/min and well in excess of the F-16's take-on rate 2,000 lbs (910 kg)/min; the transfer rate may be automatically set based on known receiver type, or it may be manually selected by the ARO. This fuel transfer module may enable aerial refueling operations via the detachable pod 204 to have a fuel transfer rate similar to the fuel transfer rate of conventional tanker configured for boom/receptacle method.

It is understood that variation in the type, configuration, arrangement and number of components in the fuel transfer module may be possible. The above is provided by way of example.

Operation Control a) Digital Flight Control Module

In an embodiment, the trailing boom refueling system 104 of the tanker 100 may include a digital flight control module to control the positioning of the detachable pod 204. The digital flight control module may comprise of 3 control loops: (1) relative-altitude pitch control via the elevators 606; (2)

bank-to-turn roll control via the ailerons; and (3) yaw control via the rudder 610. The elevators and ailerons are combined to form elevons. Gyros 634 may be installed in the detachable pod 204 for providing flight stability information.

b) Detachable Pod Flight Control Module

In an embodiment, the trailing boom aerial refueling system 104 of the tanker 100 may include a detachable pod flight control module. The detachable pod flight control module may have different detachable pod flight control algorithm "settings" for different receiver aircraft 102 types, which may be selected by the ARO. This is necessary as different receiver aircraft 102 types are of different shapes/sizes, and their aerial refueling receptacles are located at different places on the airframe, e.g. on top of the nose in the A-10; on the left wing root in the F-15; and on top of the spine in the F-16 and F-35. An acceptable safety distance during aerial refueling via the detachable pod 204 for one receiver aircraft 102 type may not be the same for another receiver aircraft 102 type, due to the location of its receptacle. The information on the type of receiver aircraft 102 may be necessary for the detachable pod flight control module to adjust the detachable pod 204 minimum permissible proximity, to fly the detachable pod 204 into the appropriate contact position 304 for the receiver aircraft 102 type, and take the necessary evasive action via activating the collision avoidance module for that specific receiver aircraft 102 type when a risk of collision is detected. The collision avoidance module may be part of the detachable pod flight control module. Further, it may function in conjunction with the laser range finders and digital flight control computer 616. If the receiver aircraft approaches at an unsafe closure rate or attitude to the detachable pod 204, the detachable pod 204 may be automatically controlled by the collision avoidance module to fly up via elevator deflection to avoid a collision.

Figure 8A:
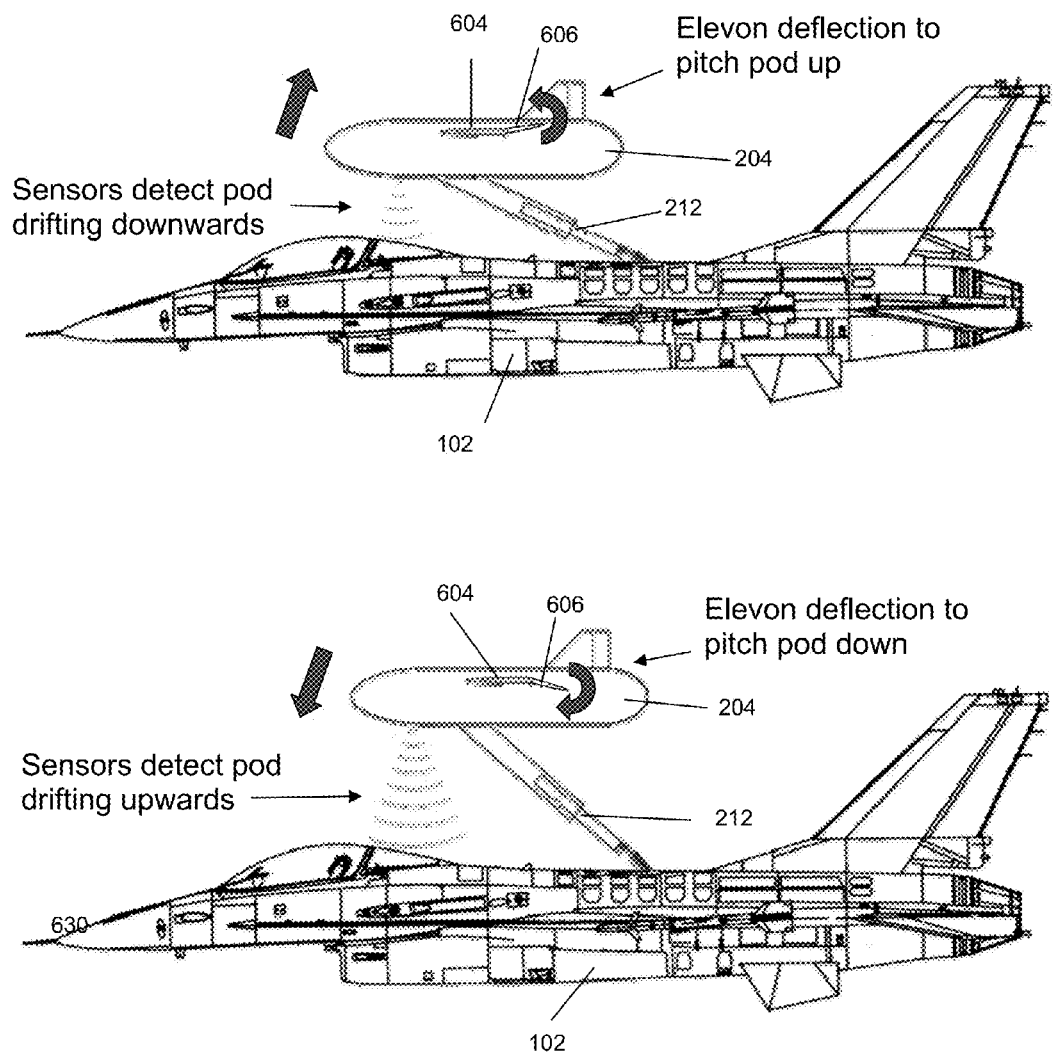
FIG. 8A-8C illustrate examples of the detachable pod flight control operation.
Figure 8B:
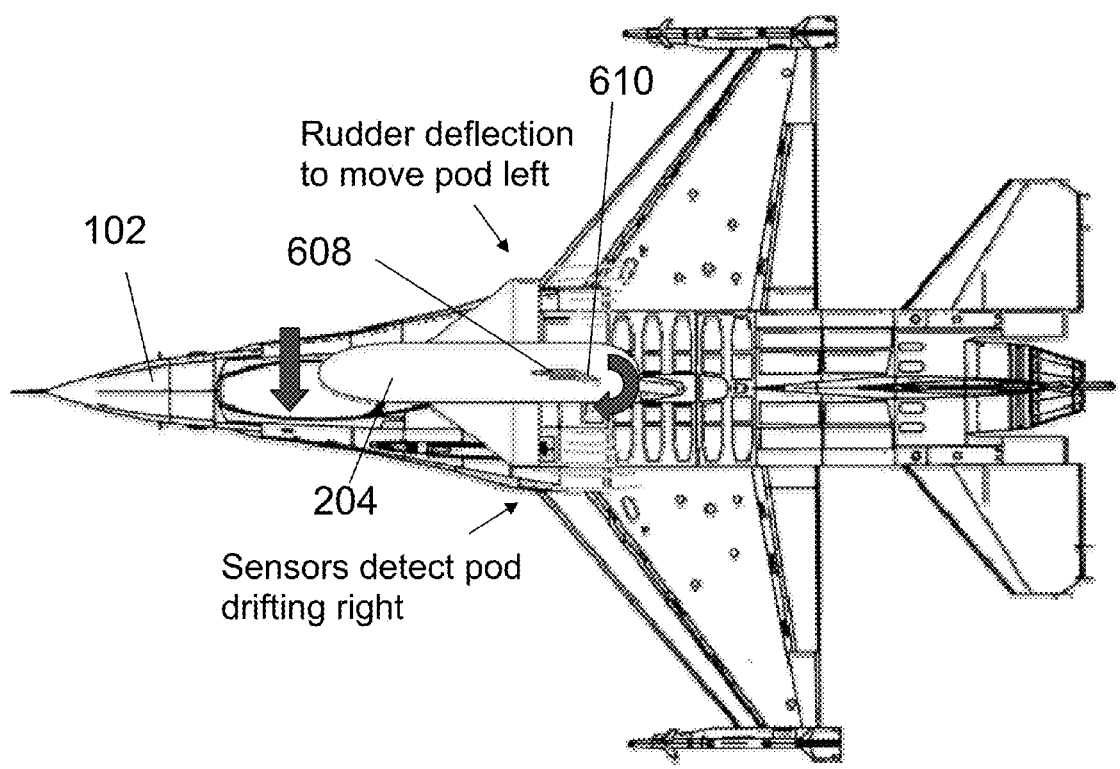
Figure 8C:
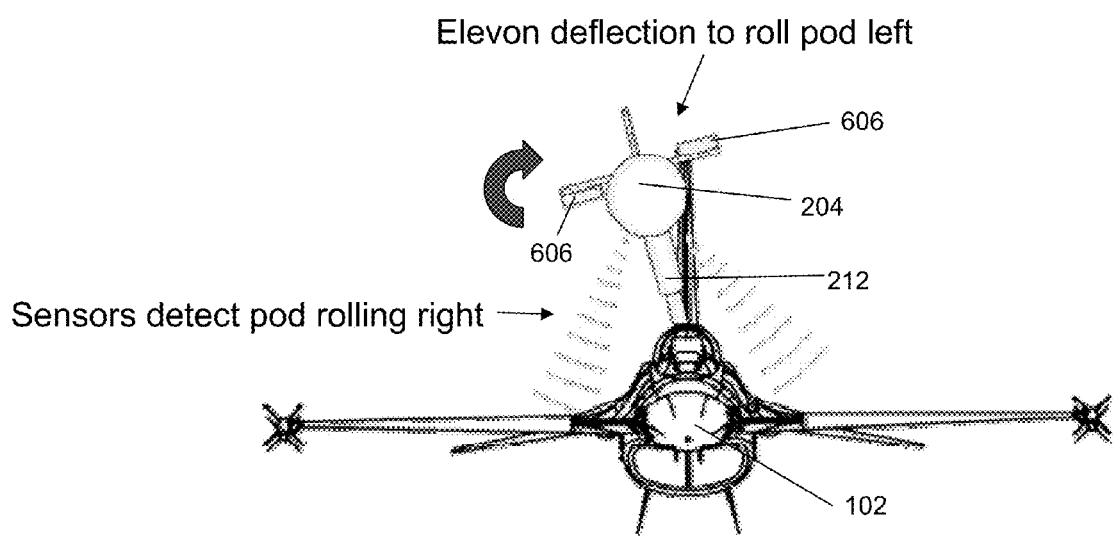

After the detachable pod's boom 212 has made contact with the receiver's receptacle, the detachable pod flight control algorithm may automatically switch to a "maintain formation" mode. In this mode, there may be a limited degree of freedom of movement in pitch and yaw direction at both ends of the boom 212 (at the boom gimbal and at the nozzle/receptacle connection), to allow for some relative motion between the detachable pod 204 and the receiver aircraft 102. This flight control mode may be able to ensure the detachable pod 204 remains within the optimum envelope for the boom's connection. Proximity sensors on the detachable pod 204 may constantly monitor the detachable pod's distance from the receiver aircraft. For example, if the sensors detect that the detachable pod 204 is drifting downwards towards the receiver aircraft 102, the flight control module may control symmetric elevon 606 deflection to pitch the detachable pod 204 back upwards, and vice versa, as shown in FIG. 8A. Likewise, if the sensors detect the detachable pod 204 is drifting right off-alignment with the receptacle, the flight control module may control a rudder 610 deflection left back to maintain alignment, and vice versa, as shown in FIG. 8B. If the sensors detect the detachable pod 204 is rolling towards one side of the receiver aircraft 102, asymmetric elevon 606 deflection may be controlled to roll the detachable pod 204 back level with respect to the receiver aircraft 102. This mode's operation illustrated in FIGS. 8A, 8B and 8C is provided by way of an example.

As the receiver aircraft 102 is connected to the detachable pod 204, while the detachable pod 204 may try to maintain formation with the receiver aircraft 102, it is possible for the receiver aircraft 102 to inadvertently maneuver itself and the detachable pod 204 outside of the safe operating envelope relative to the tanker 100, or to maneuver to the boom/receptacle pitch/yaw limits. To prevent this from happening, various preventive measures may be used. For example, warning/flashing lights on the underside of the parent pod 202; aural warnings automatically transmitted to the receiver aircraft's pilot via an existing radio communication line in the boom; verbal warnings by the ARO, who can then advise the receiver aircraft's pilot to correct his flight path or manually disconnect the boom; or as a fail-safe measure, the detachable pod's flight control module may automatically disconnect the boom 212, when it senses the receiver aircraft 102 is about to breach the safe operating envelope, without the ARO or receiver pilot taking corrective actions.

c) Refueling Operator Guidance/Control Module

In an embodiment, the trailing boom refueling system 104 of the tanker 100 may include a refueling operation control module for monitoring and controlling various aspect of the refueling operation. The ARO may be responsible for controlling the aerial refueling operation, and may use the refueling operation control module to perform this task. The ARO may be located at the refueling control station of the refueling operation control module. On older tankers like the KC-10 and KC-135, the ARO is located in the aft, lower part of the aircraft 100 close to the boom 106 where the ARO views the receiver aircraft 102 directly through a large window; while on new generation tankers such as the KC-30 and KC-767 the ARO is located close to the flight deck crew, and views the receiver remotely through video cameras and vision augmentation devices. The ARO and refueling control station for the trailing boom refueling system 104 may similarly be located close to the flight deck crew, for reasons of space availability.

The following actions may be performed manually by the ARO.

(i) deployment of the detachable pod 204 from the parent pod 202 and its retraction;

(ii) deployment/stowage of the boom assembly 212; and (iii) extension/retraction of the telescoping boom 212.

The ARO may also select the receiver aircraft 102 type to be refueled on the refueling control station, and activates the detachable pod/hose jettison module's guillotine 434, in emergency situations when the detachable pod 204 needs to be jettisoned before landing.

An embodiment of the tanker 100 may be able to refuel two receiver aircraft 102 simultaneously, or three receiver aircraft if the tanker also has a centerline boom on the aft belly of the tanker 100. Multiple AROs may be required to operate and manage multiple receiver aircraft 102 refueling operations. In another embodiment, for optimum refueling operation efficiency, two or more refueling control stations may be provided and two or more AROs may be assigned. In this embodiment each refueling control station may be configured to control one detachable pod 204. An additional advantage of such a refueling operation control module is that there is redundancy in which in the event of either on detachable pod or refueling control station malfunction, the other can be configured to take over aerial refueling operation.

It is understood that variation in the type, configuration, arrangement and number of components in the various operation control module may be possible. The above is provided by way of example.

Thus it can be seen that an aerial refueling tanker capable of simultaneously refueling two or more receptacle-equipped receiver aircraft with fuel transfer rate higher than the probe/drogue method has been provided in accordance with the various embodiments disclosed.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A trailing boom system for aerial refueling, the system comprising:
   a parent pod capable of being connected to a wing or a body of a tanker aircraft; and
   a detachable pod releasable from the parent pod, the detachable pod comprising an extendible boom for refueling a receiver aircraft in flight, the extendible boom being pivotable about a first pivot for movement in a first direction and pivotable about a second pivot for movement in a second direction, wherein the first direction is orthogonal to the second direction, and
   wherein the detachable pod further comprises a backflow reservoir configured to receive at least a portion of fuel upstream of the boom to facilitate retraction of the boom.

2. The system as claimed in claim 1, further comprising a tether/fuel hose connecting the parent pod and the detachable pod.

3. The system as claimed in claim 2 further comprising a fuel transfer module for transferring fuel from the tanker aircraft through the parent pod, the tether/fuel hose, the detachable pod and the extendible boom to the receiver aircraft.

4. The system as claimed in claim 1 further comprising a flight control module to control the positioning of the detachable pod.

5. The system as claimed in claim 1 further comprising an automatic collision avoidance module for preventing the detachable pod from colliding with the receiver aircraft.

6. The system as claimed in claim 1 further comprising a refueling operation control station for a user to interact with the various monitoring and controlling modules of the refueling operation.

7. The system as claimed in claim 1, wherein the parent pod comprises director lights for guiding the receiver aircraft into a position for connection with the extendible boom.

8. The system as claimed in claim 1, wherein the detachable pod comprises control surfaces for maneuvering the detachable pod.

9. The system as claimed in claim 1, wherein the detachable pod comprises sensors for monitoring the position of the receiver aircraft with respect to the detachable pod.

10. The system as claimed in claim 1, wherein the parent pod comprises a housing for receiving the detachable pod when retracted.

11. The system as claimed in claim 1, further comprising a gimbal mechanism for actuating the boom in the first direction about the first pivot and in the second direction about the second pivot, wherein the boom is connected to a member of the gimbal mechanism at the first pivot and the member of the gimbal mechanism is connected to the detachable pod at the second pivot.

12. The system as claimed in claim 1, wherein the boom comprises a telescoping tube within an outer tube.

13. The system as claimed in claim 1, wherein the detachable pod further comprises a spoiler adapted to generate a thrust for engaging a nozzle of the extensible boom with a receiver aircraft receptacle.

14. A detachable pod for an aerial refueling system, the detachable pod comprising:
   a boom extendible from the detachable pod, the boom suitable for refueling a receiver aircraft in flight; and
   a flight control module for controlling flight control surfaces on the detachable pod to maneuver the detachable pod in flight;
   a backflow reservoir configured to receive at least a portion of fuel upstream of the boom to facilitate retraction of the boom,
   wherein the boom is pivotable about a first pivot for movement in a first direction and pivotable about a second pivot for movement in a second direction, and wherein the first direction is orthogonal to the second direction.

15. The detachable pod as claimed in claim 14, further comprising a gimbal mechanism for actuating the boom in the first direction about the first pivot and in the second direction about the second pivot, wherein the boom is connected to a member of the gimbal mechanism at the first pivot and the member of the gimbal mechanism is connected to the detachable pod at the second pivot.

16. The detachable pod as claimed in claim 14, wherein the boom comprises a telescoping tube within an outer tube.

17. The detachable pod as claimed in claim 14, further comprising an automatic collision avoidance module.

18. The detachable pod as claimed in claim 14, further comprising a spoiler adapted to generate a thrust for engaging a nozzle of the extensible boom with a receiver aircraft receptacle.

19. A method for aerial refueling, the method comprising:
   refueling a receiver aircraft in flight via a boom extendible from a detachable pod, the boom being pivotable about a first pivot for movement in a first direction and pivotable about a second pivot for movement in a second direction, wherein the first direction is orthogonal to the second direction, the detachable pod being releasable from a parent pod, and the parent pod being capable of being connected to a wing or a body of a tanker aircraft, and
   retracting the boom to the detachable pod on completion of refueling, wherein retracting comprises pushing at least a portion of fuel upstream of the boom into a backflow reservoir disposed in the detachable pod.

20. The method as claimed in claim 19, wherein refueling comprises transferring fuel from the tanker aircraft through the parent pod, the detachable pod and the extendible boom to the receiver aircraft.

21. The method as claimed in claim 19, wherein transferring fuel from the tanker aircraft through the parent pod to the detachable pod comprises transferring fuel via a tether/fuel hose connecting the parent pod and the detachable pod.

22. The method as claimed in claim 19 wherein prior to the step of refueling, the method further comprises the steps of:
   reeling out the detachable pod from the parent pod to a predefined deployed position;
   guiding the receiver aircraft into a position for connection;
   flying the detachable pod to a contact position;
   lowering and extending the boom for connecting to the receiver aircraft; and
   commencing fuel transfer.

* * * * *